Patented Jan. 26, 1954

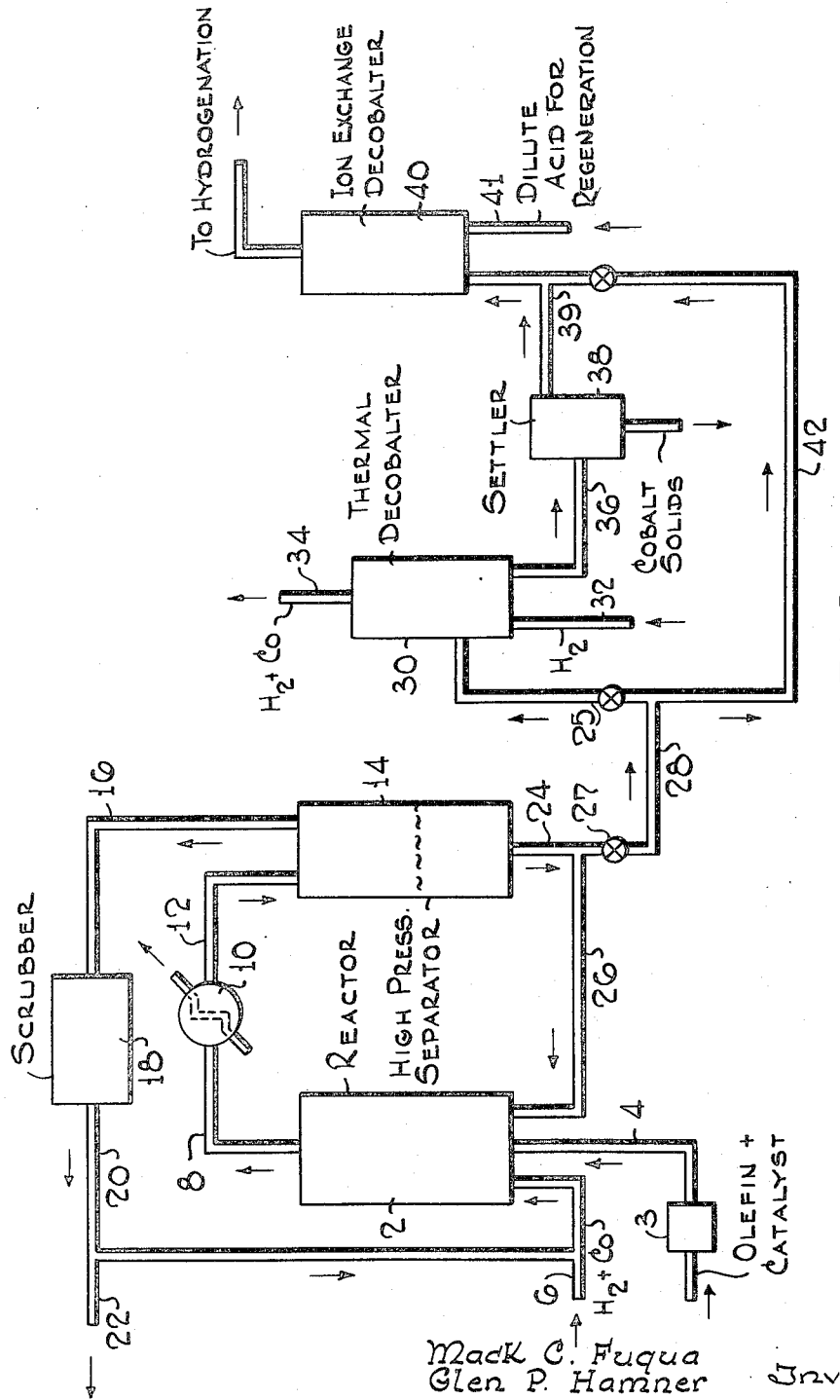

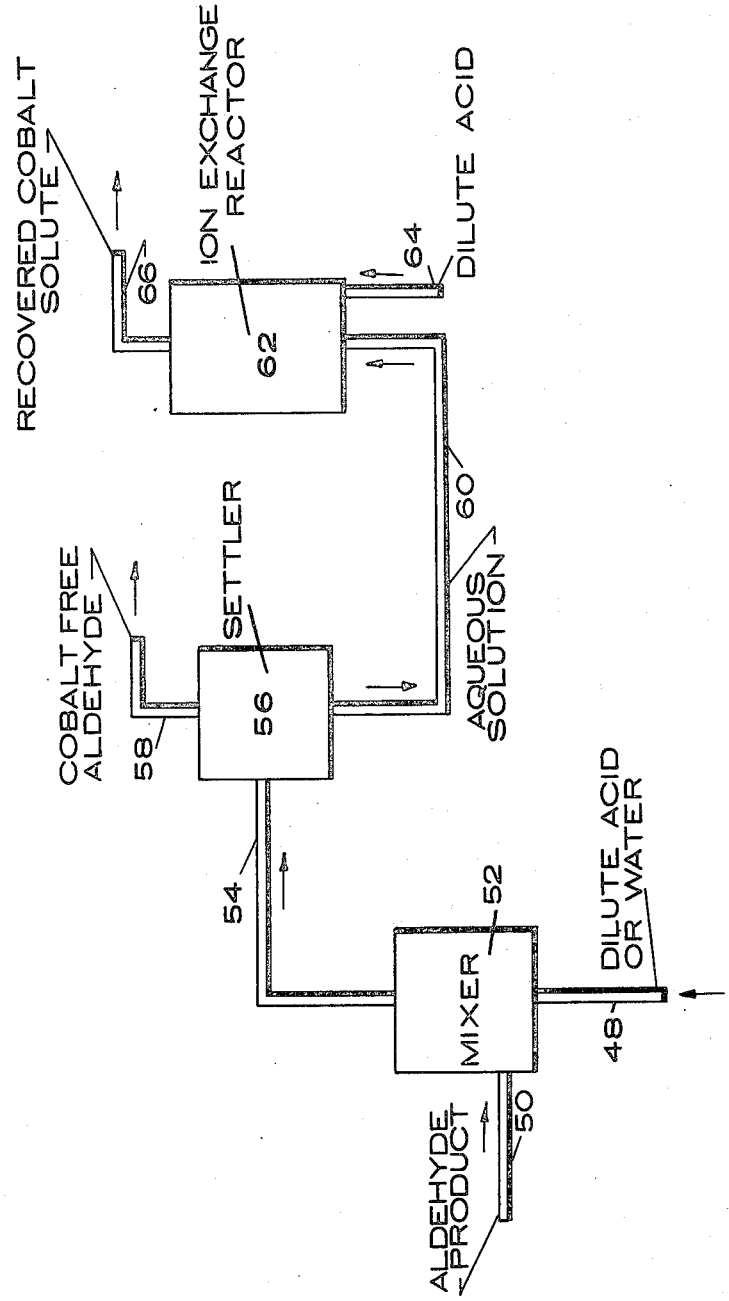

2,667,514

UNITED STATES PATENT OFFICE 2,667,514

DECOBALTING OXO ALDEHYDES WITH ION EXCHANGE RESINS

Mack C. Fuqua and Glen P. Hamner, Baton Rouge, La., assignors to Standard Oil Development Company, a corporation of Delaware Application July 11, 1951, Serial No. 236,132

13 Claims. (Cl. 260—604)

The present invention relates to the preparation of oxygenated organic compounds including aldehydes and alcohols by the reaction of carbon monoxide and hydrogen with carbon compounds containing olefinic linkages in the presence of a carbonylation catalyst. More specifically, the present invention relates to the recovery of the cobalt catalyst utilized in the foregoing reaction from the aldehyde product of the first stage of the carbonylation reaction, in which product it is dissolved in the form of cobalt carbonyl or hydrocarbonyl, for further use in the process, and to prevent the dissolved cobalt from fouling the equipment during the subsequent hydrogenation of the aldehyde-containing product formed in the first stage of the alcohol synthesis process.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, and the proper proportions of CO and $H_2$ are reacted in the presence of a catalyst to yield a product consisting predominantly of aldehydes containing one more carbon atom than the reacted olefin. This oxygenated organic mixture, which contains dissolved therein, salts and the carbonyl and hydrocarbonyl and molecular complexes of the metal catalyst, is treated in a second stage to cause removal of soluble metal compounds from the organic material in a catalyst removal zone. The catalyst-free material is then generally hydrogenated to the corresponding alcohols, or it may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and di-olefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the prior art processes is usually added in the form of salts of the catalytically active metal with high molecular fatty acids, such as stearic, oleic, palmitic, naphthenic, etc., acids. Thus, suitable catalysts are, for example, cobalt oleate or naphthenate, or iron linoleate. These salts are soluble in the liquid or liquified olefin feed and may be supplied to the first stage as a hydrocarbon solution or dissolved in the olefin feed.

The synthesis gas mixture fed to the first stage may consist of any ratio of $H_2$ to CO, but preferably these gases are present in about equal mols or volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150°–450° F. The ratio of synthesis gas to olefin feed may vary widely; in general, about 2500 to 15,000 cubic feet of $H_2+CO$ (measured at standard conditions of temperature and pressure) per barrel of liquid olefin feed are employed.

At the end of the first stage, when the desired conversion of olefins to oxygenated compounds has been effected, the product and the unreacted material are generally withdrawn and passed to a catalyst removal zone, where dissolved catalyst is removed from the mixture and it is to this stage that the present invention principally applies, as indicated.

From the catalyst removal zone the reaction products, comprising essentially aldehydes, may be transferred to a hydrogenation zone, and the product reduced by hydrogen to the corresponding alcohols in a manner known per se.

One of the problems involved in the aldehyde synthesis reaction is the fact that the catalyst metal, such as cobalt, though added as an organic salt, reacts with carbon monoxide under the synthesis conditions to form compounds such as the metal carbonyl or hydrocarbonyl. There is basis for the belief that the metal carbonyl itself is the active form of the catalyst. The catalyst dissolved in the aldehyde product must be removed prior to the subsequent hydrogenation, as otherwise it would separate out on the hydrogenation catalyst, plug transfer lines, heat exchangers, hydro oven surfaces, and otherwise disrupt smooth operation of the process. The carbonyl dissolved in the reaction product from the primary carbonylation stage is, therefore, removed in a catalyst removal, or "decobalting" zone. In the past, catalyst removal has been accomplished by heating the primary (aldehyde) reaction product in a tower which may be packed with catalytically inert material and which may be operated under elevated pressures, in the presence of an inert gasiform material, such as hydrogen, to maintain the CO partial pressures as low as possible, thereby decomposing the metal carbonyl and precipitating the metal on the packing and walls of the vessel, as well as on other surfaces therein. The carbon monoxide formed was purged with hydrogen to protect the nickel or cobalt catalyst usually employed in the subsequent hydrogenation stage. Such process, however, required periodic interruption in order to remove accumulated metallic cobalt from the packing to prevent plugging up feed inlet lines and adjacent areas of the decobalting vessel. Furthermore, cobalt metal deposited as a film on the heating means and required constant removal to prevent the plugging of the preheating equipment and coating of the contacting surfaces. The removal of these films and deposited cobalt metal was a tedious and difficult process, and the necessary shut downs added significant costs to the economics of the synthesis process.

Furthermore, an additional drawback associated with the prior art decobalting processes is the fact that the aldehyde product is maintained for extended periods of time at elevated temperatures. As aldehydes are exceptionally temperature-sensitive and undergo undesirable reactions, such as aldolization and polymerization, when they are maintained at elevated temperatures for extended periods of time, thermal decobalting had the effect of materially decreasing the yield of aldehyde and alcohol product. Thermal decobalting accompanied by hydrogen stripping is a process that requires a substantial period of time to complete the removal of cobalt and carbon monooxide. The initial decomposition of cobalt carbonyl into CO and cobalt metal or other insoluble forms of cobalt is comparatively rapid, particularly when the CO concentration is kept low by means of the purge gas. However, since the aldehyde liquid prior to the decobalting may contain up to 2000 parts or more cobalt per million, and the cobalt content of the effluent from the decobalter must be less than 2 p. p. m. to prevent fouling of the hydrogenation catalyst and equipment, the thermal decobalting operation is generally carried out for several hours, for the aldehyde synthesis reactor effluent contains also some cobalt salts, such as oleate or naphthenate, if these were originally added as catalyst, as well as some cobalt formate and basic formate, probably formed as a result of secondary reactions. These salts must also be removed, and they are considerably more difficult to decompose than the carbonyl. Accordingly, when thermal methods are employed, secondary reaction products of aldehydes are always formed, and not only are yields decreased, but usually some cobalt remains in solution in the aldehyde.

It is, therefore, the principal purpose of the present invention to provide an improved and novel means for removing dissolved carbonylation catalyst from conversion products resulting from the reaction of olefinic compounds with carbon monoxide and hydrogen.

It is also a purpose of the present invention to subject the aldehyde product containing dissolved catalyst to elevated temperatures for a period considerably shorter than that required by prior art processes, and to obtain a catalyst-free aldehyde product substantially uncontaminated with secondary reaction products.

Other and further objects of the invention will appear from the more detailed description and examples hereinafter.

It has now been found that an excellent method of removing dissolved cobalt from the aldehyde reaction product involves the use of cation exchange resins, either by directly passing the aldehyde and dissolved cobalt through the resinous material or, preferably, employing the ion exchange resin in conjunction with a conventional decobalting method; whereby, in the first stage, the bulk of the dissolved cobalt is rapidly removed by, for instance, thermal decobalting, and in the second stage the more difficultly removable cobalt is substantially completely removed by percolation at room temperatures, over a synthetic ion exchange resin. In this way there is avoided the long contact time at elevated temperatures associated with conventional thermal decobalting, and also, a product completely free of cobalt is readily obtained.

As pointed out previously, crude aldehyde prepared by the carbonylation or Oxo process, contains dissolved cobalt to the extent of about 1800–2000 parts by weight per million, expressed, as metallic cobalt, and it is necessary to reduce this to less than 5 parts, to avoid fouling of equipment by depositing cobalt on transfer lines and hydrogenation catalyst and on metallic surfaces in general. In accordance with the present invention, employing ion exchange resins, cobalt removal may be accomplished by three methods as follows:

(1) Direct contacting of the Oxo product with an ion exchange resin.

(2) Decobalting of the crude aldehyde by, say, a thermal method followed by a "clean-up" of the partially decobalted aldehyde product by contacting it with an ion exchange resinous material.

(3) Recovery of cobalt from the water layer produced in a decobalting operation.

With respect to this last method, it is again pointed out that in the oxo stage, formic acid is formed and this formic acid reacts with cobalt to form formate, a water soluble salt. It is further pointed out that the direct injection of water or steam into the crude aldehyde product results in cobalt removal and the passage of cobalt formate into the water layer resulting from treatment of the crude aldehyde product with water or steam. The cobalt may be recovered for reuse in the process by treating this cobalt containing water layer with an ion exchange resin.

The resins proposed for use in the decobalting operation are commercially available materials such as "Amberlite IR–50" and "Duolite C–10".

The "Amberlite" resins are manufactured by the Resinous Products Chemical Company of Philadelphia, Pa., whereas, the "Duolite" resin is manufactured by the Chemical Process Company, 901 Spring Street, Redwood City, California. These cationic active resins comprise polymeric substances containing acidic groups. They are products resulting from the condensation of formaldehyde or other aldehydes with phenolic materials containing in addition, sulfonic acid groups, carboxylic acid groups, etc.

The present invention and its application will best be understood from the more detailed description hereinafter, wherein reference will be made to the accompanying drawings, which are schematic representations of systems suitable for carrying out preferred embodiments of the invention.

Referring now to Figure 1, an olefinic hydrocarbon having one carbon atom less than the number of carbon atoms in the desired resulting aldehyde or alcohol is fed through preheater 3 and line 4 to the bottom portion of primary reactor 2. The latter comprises a reaction vessel which may, if desired, be packed with non-catalytic material such as Raschig rings, pumice, porcelain chips and the like and may, if desired, be divided into discrete zones or may comprise but a single reaction zone.

The olefinic feed may contain dissolved therein 1–3% by weight of cobalt naphthenate, oleate, etc., based on the olefin. Other oil-soluble cobalt compounds may also be used; cobalt-comprising slurries have also been suggested. A gas mixture comprising $H_2$ and CO in approximately equal proportions is supplied through line 6 and flows concurrently through reactor 2 with liquid olefin feed and dissolved or dispersed catalyst. Reactor 2 is preferably operated at about 2500–3500 p. s. i. g. and at a temperature of about 250°–450° F., depending upon the olefin feed and other reaction variables. As a result of the reaction between cobalt and the synthesis gas, cobalt carbonyls are formed, and it is commonly believed to be the hydrocarbonyl which catalyzes the conversion of olefins to aldehydes.

Liquid oxygenated reaction products containing cobalt carbonyl and other forms of cobalt in solution, up to about 1800–2000 p. p. m., and unreacted synthesis gases are withdrawn overhead from an upper portion of reactor 2 and are transferred through line 8 to cooler 10, and thence via line 12 to high pressure separator 14, where unreacted gases are withdrawn overhead through line 16, scrubbed in scrubber 18 of entrained liquid and cobalt carbonyl, and used in any way desired. They may be recycled to synthesis gas feed line 6 via line 20, or purged through line 22.

A stream of primary reaction product containing dissolved therein relatively high proportions of cobalt carbonyl is withdrawn from separator 14 through line 24. A portion of said withdrawn stream may be recycled, if desired, to reactor 2 via line 26 and injected at suitable points in the reaction zone to provide cooling and temperature control. The balance of the primary reaction product is withdrawn through pressure release valve 27 and is passed through line 25 to catalyst removal, or decobalting, zone 30.

In the two-stage decobalting process embodiment of the present invention, zone 30 may be a thermal decobalting unit, operated for high throughput rates, short residence time, and incomplete decobalting. The vessel is maintained at about 300° to 350° F. and at pressures of about 15 to 200 p. s. i. g. A stream of hydrogen comprising gas may be admitted through line 32 to aid in stripping and removing evolved carbon monoxide resulting from the decomposition of the metal carbonyl; the gases may be removed overhead through line 34 and used in any manner desired.

Liquid carbonylation product, still containing significant amounts, say 100 to 500 parts per million of cobalt in solution, as a result of the relatively mild thermal treatment and short residence time, and containing in suspension precipitated cobalt metal, is passed from thermal decobalter 30 via line 36 to settler 38, where the cobalt solids are allowed to settle by gravity, and from which they may be withdrawn. The supernatant liquid is passed via line 39 to secondary decobalter 40, packed with a suitable cation exchange resin described previously. The aldehyde product is percolated through reactor 40 at the rate of 0.1 to 0.3 v./v./Hr. The temperature within 40 is maintained at about 80° to 200° F., substantially lower than in the thermal decobalting zone 30. It is generally preferable to operate with two ion exchange decobalters though but one is shown; when the capacity of the resin for removing cobalt begins to decrease, the flow is switched to the second reactor, while the first is readily regenerated by percolating therethrough, dilute mineral acid, as $H_2SO_4$ or HCl, through line 41. The regeneration process also affords a means for recovering the cobalt, from the resin in the form of the corresponding cobalt salts; these may readily be reconverted into the high molecular weight cobalt soaps.

Substantially completely decobalted aldehyde is withdrawn from base exchange vessel 40; the product may, if desired, be water washed, and then may be passed to storage or to further hydrogenation to alcohol, all in a manner known per se.

The process of the invention admits of numerous modifications apparent to those skilled in the art. Thus, as already pointed out, under certain conditions it may be desirable to omit completely the thermal decobalting step, and pass the entire crude aldehyde product directly through line 42 to the base exchange decobalting zone. Such treatment is particularly indicated for exceptionally reactive aldehydes or where the crude aldehyde product had a relatively low cobalt content or high cobalt formate content. Also, though thermal decobalting has been employed as the first stage decobalting means, other forms of decobalting may be employed. Thus, there is shown in Figure 2 an operation wherein decobalting is carried out by steam, water or dilute acids. Aldehyde product from the carbonylation reaction zone containing substantial amounts of cobalt is passed into mixer 52 via line 50, and dilute acid, steam or hot water injected through line 48. The mixture is passed through line 54 to settling zone 56, aldehyde product substantially completely free of cobalt withdrawn through line 58 and an aqueous solution containing cobalt is withdrawn from settler 56 through line 60 and passed to the ion exchange reactor 62. The cobalt content of the aqueous solution is recovered by percolating over the ion exchange resin and the cobalt recovered from ion exchange reactor 62 by regeneration with dilute acid injected through line 64 in a manner previously described.

In order to show the effect secured by decobalting in the manner described above, the following example is illustrative. A heptene fraction boiling in the range of about 180°–210° F. was treated with about 2–3% cobalt oleate in the presence of 1:1 $H_2$/CO at about 3000 p. s. i. g. and 340°–350° F. The aldehyde product, containing about 1800 parts per million of cobalt, was partially decobalted by thermal means in the presence of hydrogen to yield an aldehyde product containing 58 p. p. m. cobalt. This solution was percolated at 1 v./v./hr. through the cation exchange resin "Duolite" at room temperature. The cobalt concentration of the percolated aldehyde was reduced to zero.

In another series of experiments the thermal decobalting treatment was completely omitted. Plant samples of iso-octyl aldehyde prepared as described previously and containing in solution about 1800 parts per million of cobalt were passed to a decobalting vessel containing the base exchange resin "Duolite C–10." The resin was prepared for decobalting by first washing with 2 vol. of 10 wt. per cent $H_2SO_4$ followed with 5 vol. of $H_2O$ and 3 vol. of isopropanol at about 0.5 v./v./hr. In completing a cycle the bed is back washed with solvent (isopropanol) before regeneration with the acid solution. A pH range of 1 to 7 may be used and temperature of 80°–150° F. for decobalting and regeneration. Uniform flow was maintained by a proportionating pump and rates were varied from 0.33 vol. of feed per vol. of resin per hour to 1.02 vol. feed per vol. of resin per hour.

Run A

[Resin regenerated with 10.0 wt. percent $H_2SO_4$, 0.33 vol. feed/vol. resin/hour. Resin wet with isopropanol prior to run.]

| Volume over bed (cc.) | 100 | 1,500 | 2,000 |
|---|---|---|---|
| p. p. m. cobalt in product | 73 | 20 | 20 |
| p. p. m. cobalt in product (followed by $H_2O$ wash) | | | 0 |

The above data show that the resin regenerated with 10% $H_2SO_4$ reduced the cobalt content of the aldehyde to from 1800 p. p. m. to 20 p. p. m. after 20 vols. of aldehyde passed over the bed at a rate of 0.33 vol. feed/vol. resin/hour. A single water wash reduced this to zero.

In a second series of runs, a base exchange resin known as "Amberlite-IRC–50," a carboxylic cation exchanger, prepared for use by washing with 2 vol. of 5% $H_2SO_4$ followed by 5 vol. per cent $H_2O$ and 3 vol. of isopropanol at about 0.52 v./v./hr. was employed at the same throughput rates. To conduct a complete cycle, solvent (isopropanol) miscible in both $H_2O$ and organic liquid is used to back wash before regeneration (acid wash). The resin was also wetted with isopropanol prior to the run.

Run B

[0.33 vol. feed/vol. resin/hour.]

| Volume over bed (cc.) | 100 | 400 | 1,500 | 1,800 |
|---|---|---|---|---|
| p. p. m. cobalt in product | 32 | 27 | 18 | 15 |
| p. p. m. cobalt in product (followed by $H_2O$ wash) | | | | 0 |

It was also determined that, though the cobalt originally present in the aldehyde product was mostly in the form of water-insoluble compounds, the effect of the resin-percolation was not only to remove the greater bulk of the cobalt from the aldehyde but also to convert the small amount of residual cobalt into water-soluble compounds readily extractable with warm water. Thus, when a resin-decobalted aldehyde product containing 15–25 p. p. m. of cobalt in solution was agitated with an equal volume of water at 190° F. for 30 minutes, all of the cobalt was removed by extraction from said aldehyde product.

Besides the resins mentioned specifically, it will be understood that other acid-reacting ion exchange materials, both synthetic and natural, may be employed. Resins containing phenolic, sulfonic, methylene, methylene sulfonic, and carboxylic groups are all suitable.

What is claimed is:

1. In a carbonylation process wherein carbon compounds containing olefinic double bonds, carbon monoxide and hydrogen are contacted in an initial reaction zone with a cobalt carbonylation catalyst under conditions to produce reaction products comprising aldehydes containing at least one more carbon atom than said carbon compounds and wherein said reaction products containing in solution cobalt-comprising compounds is withdrawn from said reaction zone, the improvement which comprises contacting at least a portion of the cobalt content of said aldehyde product with a cationic ion exchange resin at a temperature below about 200° F. whereby said cobalt is removed from solution.

2. In a carbonylation process wherein carbon compounds containing olefinic double bonds, carbon monoxide and hydrogen are contacted in an initial reaction zone with a cobalt carbonylation catalyst under conditions to produce reaction products comprising aldehydes containing at least one more carbon atom than said carbon compounds and cobalt compounds are dissolved in said reaction products and the solution comprising said reaction products and the therein dissolved cobalt compounds is transferred to a catalyst removal zone wherein said dissolved cobalt compounds are removed, the improvement which comprises maintaining in said catalyst removal zone a cationic exchange resin, percolating said aldehyde product through a bed of said resin, removing dissolved cobalt in said bed and recovering an aldehyde product containing substantially less cobalt in solution than the feed to said catalyst removal zone.

3. The process of claim 2 wherein at least a portion of the aldehyde soluble forms of cobalt in said solution percolated through said resin is converted into water-soluble forms of cobalt and said recovered aldehyde solution is water-washed to remove substantially completely, cobalt therefrom.

4. The process of claim 3 wherein the decobalting temperature is maintained at about 80° to 200° F.

5. The process of claim 3 wherein cobalt is recovered by percolating dilute acid through said decobalting zone.

6. In a continuous carbonylation process wherein carbon compounds containing olefinic double bonds are contacted in an initial reaction zone with carbon monoxide and hydrogen in the presence of a carbonyl-forming metal catalyst under conditions to produce reaction products comprising oxygenated organic compounds containing one more carbon atom than said carbon compounds, which reaction conditions comprise a pressure of about 100 to 300 atmospheres and wherein carbonylation catalyst metal compounds including metal carbonyls are dissoled in said reaction products and said reaction products and dissolved metallic compounds are passed to a catalyst removal zone, the improvement of employing two stages for the removal of said catalyst which comprises passing said reaction products and the therein dissolved catalyst metal compounds to a thermal catalyst decomposition zone, maintaining catalyst decomposition conditions comprising pressures substantially lower than in said initial reaction zone and temperatures in the range of about 200° to 400° F. whereby a substantial portion of said carbonyl is decomposed to oil-insoluble forms of metal and carbon monoxide, purging said carbon monoxide with an inert gas admitted to said zone, maintaining a short residence time in said zone whereby formation of secondary reaction products from said aldehyde is prevented, removing an aldehyde product from said zone containing only minor amounts of dissolved metal compounds, passing said aldehyde product through a second catalyst removal zone, maintaining in said zone a cationic exchange resin, maintaining a temperature of about 80° to 200° F. in said zone, said temperature being substantially lower than in said thermal catalyst removal zone, and withdrawing an aldehyde product substantially completely free of dissolved metal compounds.

7. The process of claim 6 wherein said aldehyde product withdrawn from said ion exchange resin catalyst removal zone is water-washed.

8. The process of claim 6 wherein catalyst is recovered from said ion exchange catalyst removal zone by intermittently percolating an acid therethrough.

9. In a carbonylation process wherein carbon compounds containing olefinic double bonds are contacted in an initial reaction zone with carbon monoxide and hydrogen in the presence of a carbonyl-forming metal catalyst under conditions to produce reaction products comprising oxygenated organic compounds containing one more carbon atom than said carbon compounds and wherein aldecarbonylation catalyst metal compounds are dissolved in said reaction products and the solution comprising said reaction products and the therein dissolved cobalt compounds is transferred to a catalyst removal zone, the improvement which comprises injecting said solution and a liquid selected from the class of water and dilute acids into a catalyst removal zone, contacting said reaction products with said liquid under conditions whereby said dissolved catalyst is converted into a water-soluble catalyst salt, withdrawing from said catalyst removal zone oxygenated products substantially free of dissolved catalyst, withdrawing from said catalyst removal zone an aqueous solution of said catalyst salt, percoalting at least a portion of said last-named solution through a cationic ion exchange resin whereby catalyst is removed from said aqueous solution, percolating a dilute acid through said ion exchange resin whereby said catalyst is converted into the corresponding salt and recovering said catalyst salt.

10. The process of claim 9 wherein said liquid injected into said catalyst removal zone is hot water.

11. The process of claim 9 wherein said liquid is a water-soluble organic acid.

12. The process of claim 9 wherein said catalyst is a salt of cobalt.

13. In a continuous carbonylation process wherein carbon compounds containing olefinic double bonds are contacted in an initial reaction zone with CO and $H_2$ in the presence of a cobalt catalyst under conditions to produce aldehydes containing one more carbon atom than said carbon compounds, and wherein cobalt compounds including carbonyls are dissolved in said reaction products and said reaction products and dissolved cobalt compounds are passed to a catalyst removal zone, the improvement of employing two stages for the removal of said catalyst, which comprises passing said reaction products and the therein dissolved cobalt compounds to an initial catalyst removal zone, maintaining temperatures within said zone in the range of about 200 to 400° F., injecting a fluid into said zone, removing carbon monoxide from said zone, maintaining a short residence time in said zone whereby formation of secondary reaction products from said aldehydes is prevented, removing an aldehyde product from said zone containing only minor amounts of dissolved cobalt, passing said aldehyde product through a second catalyst removal zone, maintaining in said zone a cationic ion exchange resin, maintaining a temperature of about 80 to 200° F., in said zone and withdrawing from said zone an aldehyde product substantially completely free of dissolved cobalt.

MACK C. FUQUA.
GLEN P. HAMNER.

References Cited in the file of this patent

UNITED STATES PATENTS

| Number | Name | Date |
| --- | --- | --- |
| 2,514,961 | Max | July 11, 1950 |
| 2,534,907 | Ham et al. | Dec. 19, 1950 |
| 2,557,701 | Smith | June 19, 1951 |
| 2,560,360 | Mertzweiler | July 10, 1951 |
| 2,604,491 | Hale | July 22, 1952 |
| 2,638,487 | Russum et al. | May 12, 1953 |

OTHER REFERENCES

Kunin, Analytical Chemistry, vol. 21, No. 1, January 1949, pages 87–96.

Kressman et al., Journal Chem. Society (London), May 1949, pages 1201–1207.